May 14, 1929.  J. R. ALLAN  1,712,805
MANUFACTURE OF WHEELS
Filed May 4, 1927    3 Sheets-Sheet 1

Inventor.
James R. Allan.
By
Atty.

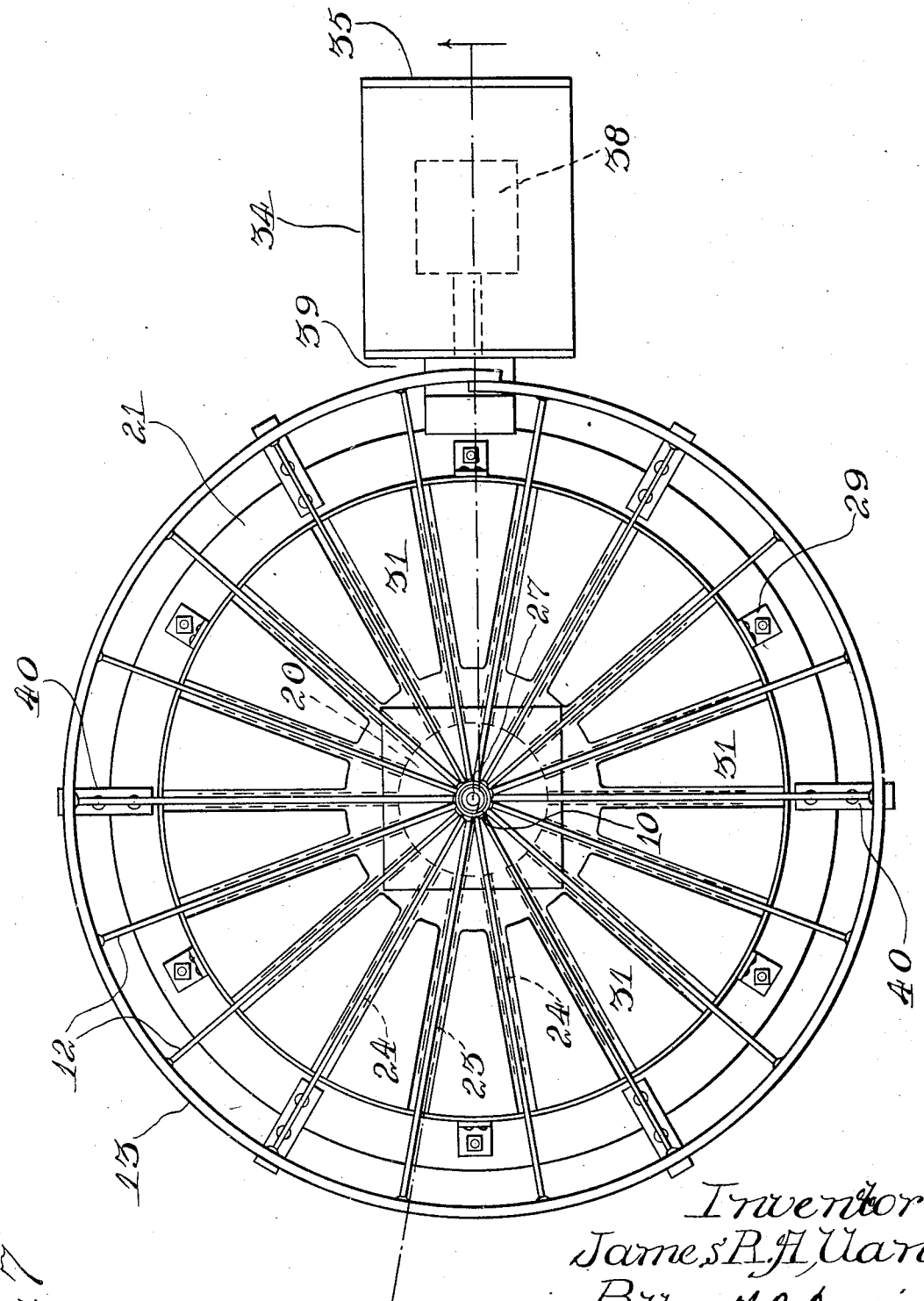

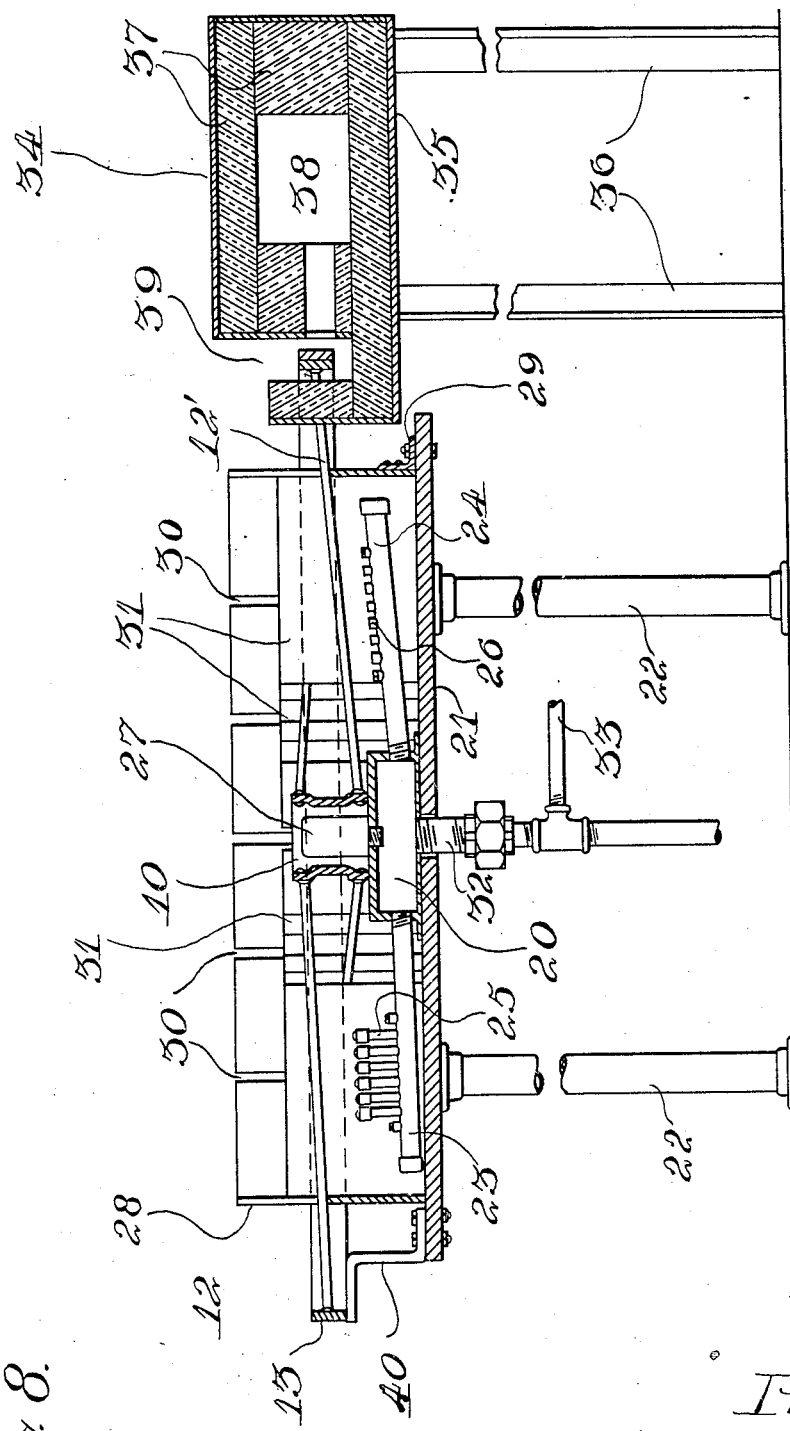

Patented May 14, 1929.

1,712,805

UNITED STATES PATENT OFFICE.

JAMES R. ALLAN, OF OAK PARK, ILLINOIS, ASSIGNOR TO INTERNATIONAL HARVESTER COMPANY, A CORPORATION OF NEW JERSEY.

MANUFACTURE OF WHEELS.

Application filed May 4, 1927. Serial No. 188,843.

This invention presents a method and apparatus for manufacturing metallic wheels for implements or vehicles.

It is an object of the invention to provide a method including a novel sequence of steps for manufacturing metal wheels, the particular method resulting in a wheel, the spokes of which are under a natural tension.

A further object of the invention is to provide novel apparatus for carrying out the method of manufacture.

Further objects of the invention will appear as the description proceeds.

The accompanying drawings assist in the disclosure of the invention. In these drawings:

Figure 7 is a plan, showing an incomplete wheel in operative position in the illustrative apparatus used in the present method of manufacture; and Figure 8 is a vertical, sectional view of the apapratus shown in Figure 7.

Figure 1:
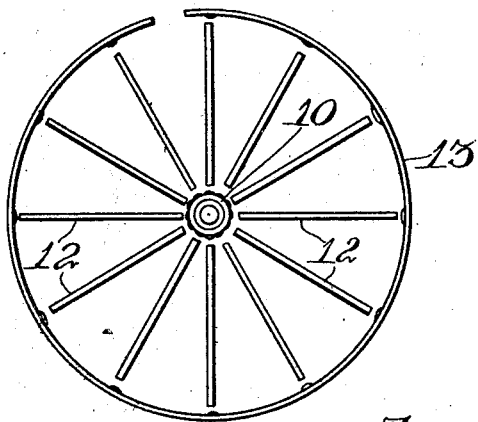
Figure 1 is a diagrammatic view, showing the separate parts of a wheel before they are united.

As the first part of the illustrative method of manufacture, certain parts such as those illustrated in Figure 1 are provided. The hub 10 is formed, having openings 11 to receive the spokes 12, which are cut to uniform length. Then a portion of rim stock is bent to approximately circular form to constitute the rim 13. It is provided with spoke holes 14.

The succeeding step in the method herein disclosed is the joining of the spokes to the hub 10 and to the rim 13 in a permanent manner, although it is within the purview of the invention that the rim might at this time be a closed structure so that the spokes would be inserted within the rim with capacity for movement relative thereto. In the illustrative method, the spokes are forged or upset so that the resulting structure is similar to that illustrated in Figures 5 and 6 of the drawings. In the accomplishment of this step the spokes are heated at their ends and are then inserted through the successive holes in the hub and the rim. This manner of positioning the spokes relative to the hub and the rim produces bosses 15 and 16, which act to permanently lock the spokes to the rim, but it is to be understood that other ways of positioning the spokes relative to the rim are within the scope of the invention. Bosses 17 and 18 unite the spokes with the hub.

Figure 2:
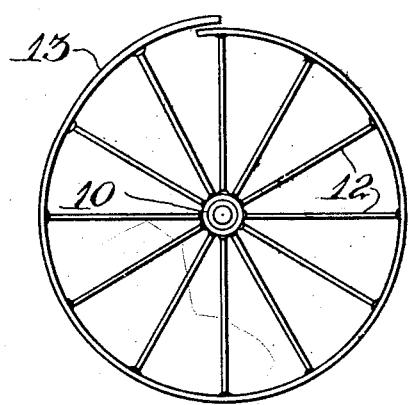
Figure 2 is a plan illustrating the condition of a wheel after the hub, rim, and spokes have been united, but the rim not welded at the joint.
Figure 3:
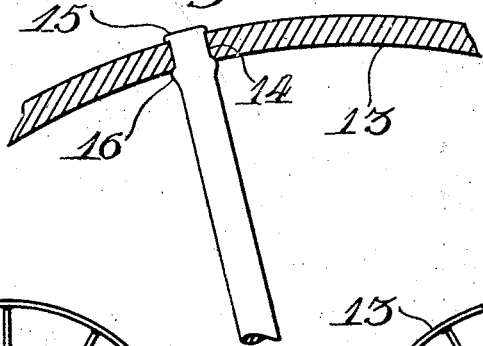
Figure 3 is a plan, illustrating the condition of the wheel after the open rim has been expanded by the simultaneous heating of the spokes before welding the rim joint.

The particular sequence of steps above related results in an unfinished wheel presenting an appearance similar to that illustrated in Figure 2 of the drawings, the rim ends in this case being unjoined and overlapped. If the invention is practiced with the use of a closed or continuous rim, the spoke ends, at this stage of the method will have capacity for movement relative to the rim or to the hub.

The remainder of the illustrative method includes a sequence of steps resulting in the production of a wheel of marked superiorities and advantages in use, all of the spokes of the finished wheel being placed under a natural tension whereby the wheel is able to withstand long continued rough usage and repeated heavy shocks without substantial distortion or buckling of its parts. The succeeding step in the present method is the heating of the spokes without a corresponding heating of the rim. It is conceivable that this step of the method might be carried out in other manners, the essential result being that the spokes are so conditioned relative to the rim that they are at a much higher temperature. As particularly set forth in this description the differential temperatures of the rim and the spokes are caused at a time when the wheel is in an unfinished condition, such as that illustrated in Figure 2 of the drawings, although, when the continuous rim is used, the outer ends of the spokes will be capable of movement relative to the rim. This heating opreation is advantageously accomplished in such a heating apparatus as that shown in Figures 7 and 8 of the drawings.

Figure 5:
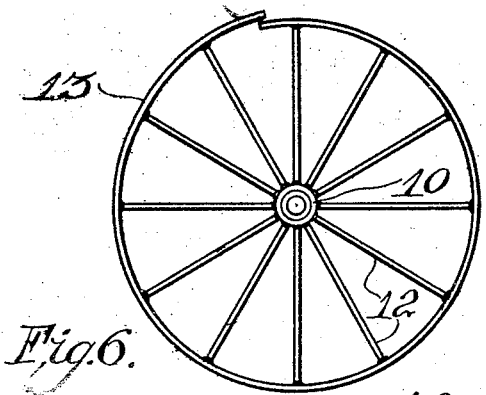
Figure 5 is a detail view, showing the manner of joining the spokes and the rim.
Figure 4:
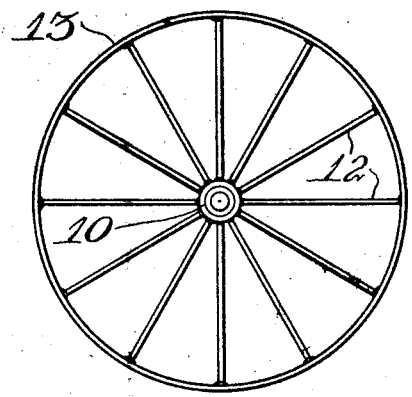
Figure 4 is a plan, illustrating the completed wheel after the rim ends have been permanently joined.
Figure 6:
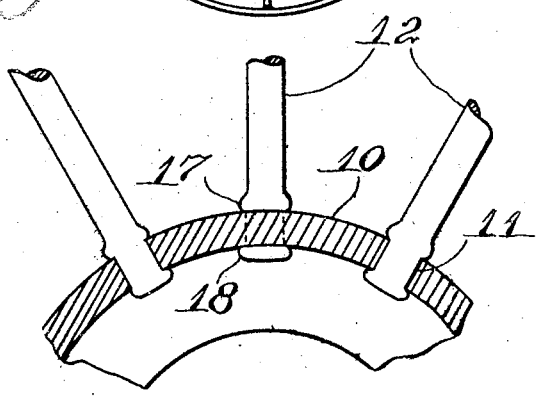
Figure 6 illustrates the manner in which the spokes are joined to the hub.

Due to this heating operation the spokes are expanded and lengthened, their outer ends being forced outwardly when their opposite ends are fixed in the wheel hub in the manner illustrated in Figure 6 of the drawings. When continuous rims are used in the carrying out of the illustrative method, the outer ends of the spokes must move outwardly relative to the rim, but in the use of such structures as are illustrated in Figures 1 to 6, inclusive of the drawings, the open rim must be expanded as a result of the expansive force exerted by the spokes. This expansion of the rim results in a decrease of the overlap of the rim ends illustrated in Figure 2, and it is within the scope of the invention that the rim ends substantially overlap after the heating operation has taken place. Lap-welding is employed for joining the rim ends.

To facilitate juncture of the rim ends it is advantageous under some circumstances to heat the rim ends at the same time at which the spokes are heated, as above indicated. This heating of the rim ends takes place in a welding furnace shown as a part of the heating apparatus of Figures 7 and 8 of the drawings. When both of these heating operations have been carried out, the wheel is immediately removed from the heating apparatus and the rim ends are joined. Lap-welding is accomplished by the immediate placing of the overlapped rim ends under a welding hammer, the blows of which automatically unite them. The wheel is now complete except for the truing and cooling operations. All deformations are taken out of the wheel in a truing device, and the spokes are brought to normal temperature, or cooled. The spokes contract and, due to the fact that they have been at a higher temperature while the rim ends were joined, there is a comparatively greater contraction of the spokes relative to the contraction of the rim, the spokes being put under a substantial degree of tension without any substantial deformation of the rim from circular form.

The illustrative heating apparatus includes a wheel heating furnace having a fuel chamber, herein shown as the central circular chamber 20. This chamber is mounted on a base preferably of table form comprising the platform 21 supported by standards 22. Radially arranged relative to the center of the fuel chamber are fuel conduits 23 and 24 which are shown supported by the fuel chamber so as to extend alternately upwardly and downwardly therefrom. As shown, the fuel conduit 23 slopes downwardly from its inner end and the opposite conduit 24 slopes upwardly from its inner end. These separate conduits are representative of alternate conduits around the fuel chamber 20. Each conduit has a slope approximately parallel to a wheel spoke positioned substantially directly above it, as illustrated in Figure 5 of the drawings.

The conduits 23 are located underneath the spokes which extend from the top of the wheel hub as it is shown in Figure 2. For that reason, the burners 25 secured to conduits 23 are of greater height than the burners 26 secured to conduits 24. The burners of the latter conduits are arranged for heating the spokes which extend from the bottom of the hub of the wheel as it is shown in Figure 2.

Wheel centering means herein shown as a stud 27 is provided. This stud is preferably mounted upon the fuel chamber 20, and is arranged centrally thereof, so as to enter the hub 10 of a wheel and properly center the latter on the heating apparatus. Wheel positioning means preferably comprising the slotted circular wall 28 assures the location of the wheel spokes over the rows of burners 25 and 26. This wall is of considerable height so as to localize the heat of the furnace, and it is held supported on the platform 21 by brackets 29 secured to the platform and to the wall. Vertical slots 30 preferably extending about half way down the sides of the wall 28 receive the wheel spokes.

The heat of the burners 25 and 26 is largely localized about the wheel spokes by radially arranged partitions 31, which separate all of the fuel conduits. These partitions are preferably bodies of material having a low degree of heat conductivity. They are mounted on the platform 21 within the circular wall 28, as shown in the drawings.

Suitable conduits, such as those shown at 32 and 33, supply fuel to the heating apparatus above described, and to the rim furnace 34, the latter comprising a casing 35 supported by standards 36 and housing heat resisting bodies 37 forming a combustion chamber 38 and a rim receiving passage 39.

Rim supports 40 secured to the platform 21 maintain the wheel in the desired position relative to the heating agencies of both the spoke heating apparatus and the rim furnace. These supports are preferably construction of Z-formation, as shown.

While the invention has been described with reference to a particular sequence of steps and to a particular structure, it is to be understood that the invention is of a scope commensurate with the breadth of the appended claims.

What is claimed as new is:

1. A method of manufacturing metallic wheels comprising forming a wheel hub with openings for spokes, bending a length of rim stock to approximately circular form with its ends overlapping each other but unjoined, permanently joining the spokes to the hub and to the rim, expanding the rim to bring its ends closer to abutting relation by heating all of the spokes simultaneously, welding the adjacent rim ends while the spokes remain heated, and cooling the spokes.

2. The method of manufacturing metallic wheels consisting of forming a hub to receive spokes, bending a length of rim stock to approximately circular form but leaving the adjacent ends unjoined, permanently joining the spokes to the hub and to the open ended rim, expanding the rim by heating all of the spokes simultaneously, permanently uniting the adjacent ends of the rim while the spokes are at a high temperature, and allowing the spokes to cool so that they are under tension in the finished wheel.

3. A method of manufacturing metallic wheels comprising forming a hub with openings for the spokes, bending a length of rim stock having spoke receiving openings to approximately circular form with its ends adjacent each other but unjoined, permanently joining the spokes to the hub and to the rim by upsetting the spoke ends, heating all of the spokes simultaneously throughout substantial portions of their lengths, welding the adjacent rim ends, and cooling the spokes.

4. A method of making a metal wheel comprising forming a hub, shaping a length of rim stock to approximately circular form with its adjacent ends in overlapped relation and unjoined, permanently joining the spokes to the hub and to the rim, heating all of the spokes and the overlapped rim ends simultaneously, welding the adjacent ends of the rim while the spokes are hot, and cooling the spokes.

In testimony whereof I affix my signature.

JAMES R. ALLAN.